3,442,675
COATING COMPOSITIONS COMPRISING CIS-1,4-POLYBUTADIENE AND NATURAL DRYING OIL
Klaus Gorke, Hullern, Richard Hilpert, Wiesbaden, and Bernhard Schleimer and Walter Dittman, Marl, Germany, assignors to Chemische Werke Huls Aktiengesellschaft, Marl, Germany, a corporation of Germany
No Drawing. Continuation-in-part of application Ser. No. 358,609, Apr. 9, 1964. This application June 26, 1967, Ser. No. 648,999
Claims priority, application Germany, Apr. 20, 1963, C 29,706; Oct. 5, 1963, C 31,059
Int. Cl. C09d 3/24
U.S. Cl. 106—227     8 Claims

ABSTRACT OF THE DISCLOSURE

A coating composition having excellent air drying properties comprises a film-forming and binding component consisting largely of 1,4-cis-polybutadiene having a viscosity of from 30 to 30,000 centipoises at 20° C. The coating composition having the foregoing base also contains one or more conventional additives and conventional solvent. It can contain also a minor amount of another coating composition binder ingredient.

---

This invention relates to the coating composition art, and is concerned with the provision of air-drying coating compositions (varnishes and paints). This application is a continuation-in-part of our U.S. patent application, Ser. No. 358,609 filed Apr. 9, 1964 (now abandoned).

About 60 to 70% of all commercially available coating compositions contain natural drying oils or stand oils producible therefrom as the film former and binder. The principal active component of such oils is the glycerine ester of linoleic, linolenic, oleic, ricinoleic or elaeostericacid. In order to improve the relatively slow drying and also the chemical resistance these oils are sometimes modified by additions of natural or synthetic resins such as colophony, dammar, copal, glyptal resin, phenol resin, maleinate resin, cumaron resin, urethane resins or epoxy resins. With films having a thickness of about 200µ the danger of shrinkage is very great.

Besides the above mentioned disadvantages and the limitations due to the fact that they are saponifiable esters the oils have the further disadvantage that their compositions may be quite variable. They differ depending upon their origin with respect to the amount of free acid and with respect to their compatibility with basic pigments such as zinc oxide and red lead so that sometimes special precautions must be taken to neutralize a too high acid content of an oil. Due to the formation of salts of the metals of the pigment or dryer with the free acid of the oil the resulting film may exhibit a fogginess or lack of luster. One cannot give a reliable statement as to the stability in storage of such coating compositions.

It has been attempted to replace the natural oils by synthetic materials. It is known for instance to use polymers of compounds having conjugated double bonds as film formers and binders for air and oven dried coating compositions. Such processes are described in German Patent No. 1,133,894 and Belgian Patent No. 605,225. In particular 1,4 trans and 1,2 polymers of 1,3 butadiene and 1,2-3,4- and 1,4-cis or trans polymers of 1,3-isoprene have been produced. These polymers have not attained any importance for the production of air drying coating compositions. They are in general so highly viscous that the coating compositions made therefrom exhibit an essentially poorer covering power than coating compositions based upon natural oils. Besides coating compositions made with such binders dry in the air more slowly than coating compositions made with natural oils such as linseed oil. They are therefore limited practically to use as lacquers for tin cans to be baked at temperatures above 150° C.

It has now been found that air drying coating compositions containing polymers of olefinic compounds having conjugated double bonds as film forming and binding agents are free of the disadvantages above referred to provided that the film forming and binding ingredient of the coating composition contains from 50 to 100%, preferably from 75 to 100%, of 1,4-cis-polybutadiene having a viscosity of from 30 to 30,000 cp./20° C. and preferably from 200 to 10,000 cp./20° C. With this low viscosity 1,4-cis-polybutadiene that can be made by the polymerization of butadiene with metallorganic mixed catalysts the coating composition dries surprisingly better in air than for example a coating composition made of a stand oil derived from linseed oil of similar viscosity. The oxidative cross-linking of the cis-polybutadiene chain takes place so readily that both the dust-free dryness, drying stage 1 of the German standard DIN 53 150, and the complete drying of the coating compositions of the present invention are materially faster than with similar coating compositions containing linseed oil as the binder. As distinguished from trans products, polyisoprene and linseed oil the reactivity of the cis-1,4-polybutadiene is so great that at elevated temperatures they gel similarly to tung oil. Films formed of low viscosity 1,4-cis-polybutadiene having a thickness of 200µ dry without shrinking or shriveling as distinguished from linseed oil films made with linseed oil. Due to the absence of saponifiable esters the gloss, the stability against chemicals and the water proofness of the films are materially improved. The compatibility with pigments of the cis-polybutadiene is excellent because it does not contain any acid or ester groups. There is no danger of a thickening of the coating composition upon the addition of basic pigments. Consequently there is no danger of thickening of the coating composition during storage when it contains 1,4-cis-polybutadiene as the binder. Since the polymerization of butadiene to the 1,4-cis-polybutadiene can be carried out very uniformly the preparation of the film former and binder can be maintained substantially constant and uniform as compared with the natural oils. The color value of the cis-polybutadiene is practically zero. Compared with a coating of a coating composition according to the present invention with a pigment volume concentration of 15% titanium-dioxide-rutile a similar coating having a linseed oil base has a yellow color.

The film former and binder can be given further advantageous properties such as improved adhesiveness and improved wettability by the introduction of reactive groups with the cis-polybutadiene molecule for example by epoxidizing a part of the double bonds of the polymer in known manner. It is sufficient generally to epoxidize from 1 to 50%, preferably from 5 to 20% of the double bonds. The epoxy group is very reactive and imparts a good adhesion to e.g. metals, wood and paper.

It is also possible to modify the cis-polybutadiene in known manner by effecting a Diels-Alder addition to form 1 to 50%, preferably 5 to 20% of the double bonds present in the polybutadiene e.g. with hexachlorocyclopentadiene. In this case, depending upon the amount of the added hexachlorocyclopentadiene, more or less strongly self-extinguishing products are obtained.

It has been found further that the coating compositions containing the 1,4-cis-polybutadiene exhibit still other valuable properties if the 1,4-cis-polybutadiene used is given an acid number within the range from 0.1 to 50 by the addition of unsaturated compounds that contain carboxyl and/or carboxyl anhydride groups. Such polybutadiene derivatives, the production of which is not claimed are obtained by the addition of unsaturated acids or their anhydrides in quantities corresponding to the specified acid numbers.

As suitable acids which can also be used as their anhydrides, maleic acid, itaconic acid, citraconic acid, chloromaleic acid and methyl and ethylmaleic acids may be named. Their reaction with polybutadiene takes place at elevated temperature. For example maleic acid anhydride reacts smoothly with 1,4-cis-polybutadiene at 180° C., within about 2 hours.

The amount of acid or anhydride to be used, that is, the preferred acid number of the polybutadiene depends upon the intended use of the coating composition. A coating composition of low acid number is preferred as a finishing coating while a coating composition having a high acid number is better suited as a base or prime coating. The coating composition moreover has the over all advantage, when complete non-saponifiability of the binder is not required e.g. in an enamel paint.

The carboxyl and/or carboxyl anhydride groups improve the adhesiveness of the polybutadiene and thus also the binder as compared to paint vehicles which contain compounds to improve the wettability with respect to pigments and the miscibility with respect to polar groups e.g. with driers, natural and/or synthetic resins, vegetable drying oils and/or their stand oils. The acid cis-polybutadiene may therefore be blended with coating compositions according to the invention without disadvantage with from 5 to 90% by weight of drying and/or non-drying oil or with from 5 to 75% by weight of natural and/or synthetic resin.

It is also possible to react the acid cis-polybutadiene in known manner with compounds which, due to their reactive groups, react with carboxyl and carboxyl anhydride groups. Such reactive groups are e.g. amide, amine, isocyanate and hydroxyl groups.

It is obviously also possible to mix the acid cis-polybutadiene with compounds containing reactive groups, to place the mixture on a paint carrier and to effect the reaction by raising the temperature of the mixture.

Varnishes and paints with air-drying oil bases consist primarily either of vehicle and solvent ("clear varnish," Case 1), or of vehicle, pigment and solvent ("pigmented paint," Case 2). In both cases there are (or, may be) added, in well known manner, small quantities of quick-driers (for example, naphthenates of lead or cobalt) which will accelerate the autoxidizing desiccation of the vehicle. Further well-known additives in small percentages are wetting agents (such as soya lecithin), flow-promoting agents (such as crotonic acid), anti-skinning agents (such as oximines) and mold-resistant agents (such as mercury salts). The total amount of quick-driers and additives will never exceed a few percent by weight of the varnishes.

In applicants' own specific cases the compositions are as follows:

Case 1, clear varnishes: Percent
Vehicle + additive _____ 10–95
Solvent _____ 90–5

Vehicle, 50 to 100 percent by weight:
(a) Polybutadiene, its double bonds being approximately 80% (70–90%) and present in the 1,4-cis-configuration, 0 to 50 percent by weight.
(b) Vehicles mentioned in the specification, for example, natural drying oils, such as linseed oil, wood oil, soya oil, safflower oil, oiticica oil, dehydrated castor oil, peanut oil.

Case 2, pigmented paints: Percent
Vehicle + additive _____ 10–70
Pigments _____ 5–80
Solvents _____ 10–60

The composition of the vehicle here is the same as in Case 1 of the clear varnishes. Suitable pigments include: $TiO_2$; red lead, ZnO, Zn chromate; antimony white; Prussian Blue; Cadmium Red; silica flour, white lead, lithopone, barite, graphite.

In the following table of Examples 1–20 the items listed under the heading "composition" are as follows.

(a) In Examples 1, 2, 3, 6, 7, 8 and 16 the polybutadiene is a mixture of 80% by weight of 1,4-cis- and 20% by weight of 1,4-trans-polybutadiene.

(b) In Examples 11 and 12 the polybutadiene is a mixture of 22% by weight of 1,4-cis- and 78% by weight of 1,4-trans-polybutadiene.

(c) In Examples 13, 14 and 15 the polybutadiene epoxide is an epoxidized 100%, 1,4-cis-polybutadiene containing 11.7% by weight of oxygen, corresponding to an epoxidation of about 50% of the double bonds.

(d) In Example 18 the polybutadiene is a mixture of 24% by weight of 1,2-polybutadiene, 39% by weight of 1,4-cis-polybutadiene and 37% by weight of 1,4-trans-polybutadiene.

(e) In Example 19 the polyisoprene consists of 75% by weight of 1,4-cis-polyisoprene and 25% by weight of 3,4-cis-polyisoprene.

(f) In Example 20 the polybutadiene adduct is the Diels-Alder adduct of a 100%, 1,4-cis-polybutadiene and hexachlorocyclopentadiene. Its chlorine content is 24.35% by weight.

All of the polymers were made in known manner by the polymerization of the corresponding monomers.

(g) In Examples 4, 5, 9, 10 and 17 the oils named were commercial products.

Examples 11 and 12 show how strongly the drying time is increased by a preponderant amount of the trans-polybutadiene in the polymer. It is remarkable, as shown by Example 19, that the coating composition containing polyisoprene takes 2½ times as long to dry as the coating composition containing a preponderant amount time is increased by a preponderant amount of the trans-of the trans-polybutadiene.

| No. | Composition | Viscosity, cp./20° C. | Mean mol. wt. | Dryer (as naphthenate to binder, percent) | Temperature, °C. | DIN 53 150 Drying Stage, hours | Shrink | Gelatinizing ability seconds/°C |
|---|---|---|---|---|---|---|---|---|
| 1 | Polybutadiene | 711 | 6,500 | | 20 | 140 | No | 430/340 |
| 2 | do | 1,880 | 11,000 | | 20 | 140 | No | 408/340 |
| 3 | do | 3,991 | 17,000 | | 20 | 140 | No | 380/340 |
| 4 | Linseed oil | 831 | | | 20 | 720 | After 36 hrs | |
| 5 | Tung oil | 295 | | | 20 | 60 | After 1 hr | 682/290 |
| 6 | Polybutadiene | 711 | 6,500 | 0.1 Co | 20 | 36 | After 24 hrs | 430/340 |
| 7 | do | 1,880 | 11,000 | 0.1 Co | 20 | 24 | No | 408/340 |
| 8 | do | 3,991 | 17,000 | 0.1 Co | 20 | 24 | No | 380/340 |
| 9 | Linseed oil | 831 | | 0.1 Co | 20 | 60 | After 48 hrs | |
| 10 | Tung oil | 295 | | 0.1 Co | 20 | 12 | After 0.5 hrs | 682/290 |
| 11 | Polybutadiene | 41,142 | 40,000 | | 20 | 280 | After 36 hrs | |
| 12 | do | 41,142 | 40,000 | 0.1 Co | 20 | 90 | After 35 hrs | |
| 13 | Polybutadiene epoxide | 413 | 11,500 | | 20 | 150 | No | |
| 14 | do | 413 | 11,500 | 0.1 Co | 20 | 36 | No | |
| 15 | do | 413 | 11,500 | 0.1 Co | 80 | 0.5 | No | |
| 16 | Polybutadiene | 1,880 | 11,000 | 1.0 Pb-Mn in proportion of 9:1 | 50 | 3 | No | 408/340 |
| 17 | Linseed oil | 831 | | do | 50 | 24 | After 12 hrs | |
| 18 | Polybutadiene | | | do | 20 | 140 | No | |
| 19 | Polyisoprene | | | do | 20 | 720 | No | |
| 20 | Polybutadiene adduct | 3,568 | | 1.5 Pb/1.5 Mn/1.3 Co | 20 | 6.5 | No | |

NOTE.—Examples: All films—200μ thick on glass.
In the table Examples 4, 5, 9, 10, 11, 12, 17, 18 and 19 are tests for comparison.

Example 21

The binder used consisted of 90% by weight of the binder of Example 3 and 10% by weight of the binder of Example 13. The composition contained 0.5% by weight of cobalt naphthenate and 2.0% by weight of lead naphthenate, based upon the weight of the binder, as drier. The pigment volume concentration was 15% titanium dioxide (rutile). The composition was diluted with testing gasoline. The viscosity in a 4 mm. Ford viscosimeter at 20° C. was 130 seconds. The viscosity by a shear-gradient (1/sec.) 9445 was 4.4 poises. The solids content was 91% by weight. The film thickness was 200μ, moist. The dust drying according to DIN 53 150, drying stage 1, was 9 hours. The film was hardened through at about 24 hours. The gloss lengthwise was 95%. There was no shrinkage and the color was pure white.

Comparative test with linseed oil-stand oil as the binder.

The binder was a linseed oil-stand oil of 8.3 poises viscosity according to Example 4. The drier and pigment were the same as in Example 20. The diluent was mineral spirits. The viscosity in a 4 mm. Ford viscosimeter at 20° C. was 130 seconds. The viscosity by a shear-gradient (1/sec.) 9445 was 5.5 poises. The solids content was 94% by weight. The film thickness was 200μ moist. The dust-drying according to DIN 53 150, drying stage 1, was 20 hours. The film was thoroughly hardened in about 240 hours. The gloss, lengthwise, was 80% with some fogging. There was no shrinkage after 24 hours. The color was yellowish.

The change in properties which results from the addition of carboxyl and/or carboxyl anhydride groups is shown in the following Examples 22–27. In these examples a polymer consisting of 76% by weight of 1,4-cis-polybutadiene, 23% by weight of 1,4-trans-polybutadiene and 1% by weight of 1,2 polybutadiene having a molecular weight of 5000, a viscosity of 1.19 poises at 50° C., a density of 0.8897 at 50° C. and an iodine number of 454 is referred to a polybutadiene A. Also in the following examples the addition product formed by heating polybutadiene A with 1% by weight of maleic acid anhydride at 180° C. for 2 hours is referred to as "polybutadiene B." It consists of 79% by weight of 1,4-cis-polybutadiene, 20% by weight of 1,4-trans-polybutadiene and 1% of 1,2-polybutadiene, has a molecular weight of 5000, a viscosity of 1.43 poises at 50° C., a density of 0.8948 at 50° C., an iodine number of 455 and an acid number of 12.4.

Example 22

An addition of 0.1% by weight of cobalt in the form of the naphthenate as well as in the form of the octoate in polybutadiene A precipitates, whereas it is soluble in polybutadiene B.

Example 23

A mixture of 75% by weight of polybutadiene A and 25% by weight of linseed oil-stand oil, said mixture having a viscosity of 90 poises at 20° C., is turbid. A similar mixture containing polybutadiene B instead of polybutadiene A remains clear at room temperature.

Example 24

Polybutadiene A, in a film 200μ thick, wets a glass plate poorly whereas under the same conditions polybutadiene B wets a glass plate excellently.

Example 25

A mixture of 90% by weight of polybutadiene A and 10% by weight of colophony does not become homogeneous when heated at 250° C. for 2 hours: a sediment remains and the supernatant liquid, after cooling, gives a strongly fogged film. A mixture of 90% by weight of polybutadiene B and 10% by weight of colophony reacts at 250° C. with vigorous foaming and within 1 hour and after cooling gives a completely clear film.

Example 26

A mixture of 95% by weight of polybutadiene A and 5% by weight of a ommercial polyamid synthetic resin, obtained by condensation of di-, and tri-merized unsaturated aliphatic acids with polyamines, and available under the trade name "Versamid 930" does not react upon heating for 2 hours at 250° C. If however polybutadiene B is substituted for polybutadiene A a smooth product is obtained in about 20 minutes at 250° C. After cooling the latter product gives a completely clear film.

Example 27

A mixture of 75% by weight of polybutadiene A and 25% by weight of ground nut oil remains turbid whereas a similar mixture of ground nut oil and polybutadiene B remains clear at room temperature.

Example 28

A polymer consisting of 82% by weight of 1,4-cis-polybutadiene, 17% by weight of 1,4-trans-polybutadiene and 1% by weight of 1,2-polybutadiene having a molecular weight of 14,000 a viscosity of 12.6 poises at 50° C., a density of 0.8912 at 50° C. and an iodine number of 461 was heated at 180° C. for 2 hours with 4% by weight of maleic acid anhydride. After cooling the product was mixed with 50% by weight of a diisocyanate commercially available under the trade name Desmodur N. The resulting mixture was applied to glass and to tinned iron as a wet film having a thickness of 200μ and the films were baked for 1 hour at 180° C. The resulting film was clear and glossy and shows under a cupping of 3 mm. a scratch hardness of 20 mm. and an outstanding tenacity.

Under the same conditions, but without the reacting the polymer with the maleic acid anhydride the film is weak and turbid.

The test method DIN 53 150 referred to above is carried out as follows:

The adhesive to be tested is spread by means of a draw blade to a wet film thickness of 200μ on a smooth, cleaned and defatted glass plate and laid horizontally at room temperature with avoidance of direct sunlight. From time to time the film is strewn with sand which passes without leaving any residue through a standard sieve 0.315 DIN 4188 but remains on a standard sieve 0.16 DIN 4188. (0.315 DIN 4188 has mesh openings 0.315 mm. across and wires 0.2 mm. diameter and 377 mesh/cm.$^2$. 0.16 DIN 4188 has mesh openings 0.16 mm. across and wires 0.1 mm. in diameter and 1480 mesh/cm.$^2$.) This sand remains for 10 seconds on the test surface. If it can then be removed easily and completely with a camels hair brush this indicates that drying stage 1 has been reached. The time required to arrive at drying stage 1 is noted and is given in the preceding table in hours.

The following additional practical examples are included:

Example 29.—Clear varnish rimer

A polybutadiene oil as set forth in Example 1 is prepared in known manner. The steric composition is as follows:

80% of 1,4-cis configuration
20% of 1,4-trans configuration
Viscosity: 700 cp./20° C.

This butadiene oil of Example 1 is mixed with 2% of maleic acid anhydride and the mixture heated for more than 2 hours at 180° C. under an inert atmosphere. The resulting adduct is then cooled to room temperature whereafter there are added, in the form of their naphthenates or octoates, 0.2% of lead, 0.05% of manganese and 0.05% of cobalt, computed as metal relative to the adduct. Thereupon there is admixed a solvent mixture consisting of 95% white spirit and 5% of butylglycol in an amount such that the ratio of adduct in the resulting solution amounts to 50%. This solution has a very low viscosity in spite of its vehicle-(adduct) content of 50%, the viscosity in a 4 mm.-Ford-viscometer at 20° C. being 18 seconds. Due to this characteristic, the clear varnish is outstandingly suitable for deep penetration of poorly absorbing alkaline masonry such as "Sicht" concrete or asbestos-cement. Due to the unsaponifiability of the adduct vehicle strongly alkaline bases can be primed and prepared for subsequent coats, for example, an emulsion paint. The primer dries in approximately 6 hours and can then be covered with another coat. A primer with a purely linseed oil base will become dry at best after 24 hours.

Example 30.—Red lead primer

Polybutadiene oil-maleic acid anhydride-adduct as given in Example 28 is heat-treated with linseed oil at a ratio of 1:1 for 9 hours at 250° C. under an inert atmosphere to a viscosity of 90 poises/20° C. This product is used to prepare a red lead paint in accordance with the following formulation:

| | G. |
|---|---|
| The above heat-treated product | 102.0 |
| Zirconium octate solution 6% of zircon in xylene | 3.8 |
| "Marlophen 83" (R) (polyethyleneglycol) | 5.0 |
| "Aerosil 2941" (R) ($SiO_2$) | 14.0 |
| Red lead, pure | 691.0 |
| Nickel octoate solution, 4% of nickel in xylene | 2.2 |
| Cobalt octoate solution, 6% of cobalt in xylene | 1.6 |
| Molydbenum octoate, 6% of molybdenum in xylene | 0.8 |
| Lead octoate solution, 10% of lead in xylene | 2.8 |
| "Intermediate 109" (R) (anti-skinning agent) | 0.9 |
| "Ascinin R" (R) (anti-skinner agent) | 1.1 |
| White spirit | 204.0 |
| Butanol | 15.4 |

The paint resulting from mixing these ingredients has a viscosity of 110 sec. in a 4 mm. Ford glass at 20° C. It becomes dust-dry after 45 minutes and fully dry after 150 minutes. It can be covered with another coat after one hour. A corresponding primer with a pure linseed oil-stand base—90 poises/20° C.—becomes dust-dry only after 300 minutes, and not fully dry until after 900 minutes.

One coat of the above primer will result in a thickness of more than 50μ. This primer, when compared with a primer using a linseed oil-stand oil base of 90-poises, has an enormously greater rust-protecting effect due to its high water-proofing property and strongly reduced swelling of the heat-treated product.

The example can be varied in that pure polybutadiene with a high cis-bond content can be employed in place of the polybutadiene-maleic acid anhydride adduct.

We claim:

1. An air dryable coating composition in which the film forming and binding ingredient consists of from 50 to 95% by weight of a polybutadiene having from 70 to 90% of 1,4-cis double bonds and a viscosity of from 30 to 30,000 centipoises at 20° C., and from 5 to 50% of at least one natural drying oil.

2. An air dryable coating composition as defined in claim 1, wherein the coating composition is a clear varnish.

3. An air dryable coating composition as defined in claim 1, wherein the coating composition is a pigmented paint containing 5–80% by weight of pigment.

4. A composition as defined in claim 1 in which from 1 to 50% of the double bonds of the polybutadiene contain an addition of a member selected from the group consisting of maleic anhydride and hexachlorocyclopentadiene.

5. A composition as defined in claim 1 in which the 1,4-cis-polybutadiene is combined with sufficient maleic anhydride that the acid number is within the range from 0.1 to 50.

6. A composition as defined in claim 5 in which the drying oil is a vegetable oil.

7. A composition as dfiened in claim 5 in which the acid 1,4-cis-polybutadiene is mixed with from 5 to 75% by weight of a resin selected from the group consisting of colophony and polyamide resins.

8. A composition as defined in claim 5, in which the acid adduct of 1,4-cis polybutadiene and maleic anhydride has been reacted with from 0.5 to 1.2 equivalents, based upon the amount of carboxyl groups present, of an isocyanate.

References Cited

UNITED STATES PATENTS

| 2,151,382 | 3/1939 | Harmon | 260—80.7 |
|---|---|---|---|
| 2,586,594 | 2/1952 | Arundale et al. | 260—680 |
| 2,652,342 | 9/1953 | Gleason | 106—285 |
| 2,819,302 | 1/1958 | Koenecke et al. | 260—519 |
| 2,967,174 | 1/1961 | Bartl | 260—78.5 |
| 3,043,705 | 7/1962 | Kiefer | 106—287 |
| 3,097,108 | 7/1963 | Bosmajian | 208—1 |
| 3,196,121 | 7/1965 | McKay et al. | 260—23.7 |
| 3,253,000 | 5/1966 | Kirchhof et al. | 260—348 |

OTHER REFERENCES

Payne, "Organic Coating Technology," Vol. 1, p. 25, TP 935 p. 38 (1954).

DONALD E. EZAJA, Primary Examiner.

R. A. WHITE, Assistant Examiner.

U.S. Cl. X.R.

106—265; 260—23.7; 117—167